United States Patent
Griffiths et al.

(10) Patent No.: US 9,121,349 B2
(45) Date of Patent: Sep. 1, 2015

(54) FUEL SYSTEM

(75) Inventors: Michael Griffiths, Bromsgrove (GB); Jonathan David Pye, East Grinstead (GB)

(73) Assignee: ROLLS-ROYCE CONTROLS AND DATA SERVICES LIMITED, Derby (GB)

( * ) Notice: Subject to any disclaimer, the term of this patent is extended or adjusted under 35 U.S.C. 154(b) by 744 days.

(21) Appl. No.: 13/415,168

(22) Filed: Mar. 8, 2012

(65) Prior Publication Data

US 2012/0227842 A1    Sep. 13, 2012

(51) Int. Cl.
| | |
|---|---|
| F02C 7/22 | (2006.01) |
| F02C 7/228 | (2006.01) |
| F02C 7/232 | (2006.01) |
| F02C 7/236 | (2006.01) |
| F02C 9/26 | (2006.01) |
| F02C 9/34 | (2006.01) |

(52) U.S. Cl.
CPC ............... *F02C 7/232* (2013.01); *F02C 7/228* (2013.01); *F02C 7/236* (2013.01); *F02C 9/263* (2013.01); *F02C 9/34* (2013.01); *F05D 2270/62* (2013.01); *Y10T 137/85938* (2015.04)

(58) Field of Classification Search
CPC ............ F02C 7/228; F02C 9/34; F02C 7/236; F23N 2041/20; F23N 2037/02; F23R 3/346; F23R 3/28; Y10T 137/7819; Y10T 137/777
USPC .................. 137/505.35, 489.5, 12, 495, 869, 137/118.02, 492.5; 251/28, 282, 63; 60/39.281
See application file for complete search history.

(56) References Cited

U.S. PATENT DOCUMENTS

| | | | |
|---|---|---|---|
| 4,846,210 A * | 7/1989 | Loxley .......................... | 137/110 |
| 5,402,634 A * | 4/1995 | Marshall ........................ | 60/776 |
| 6,955,040 B1 | 10/2005 | Myers, Jr. et al. | |
| 7,007,476 B2 | 3/2006 | Mains et al. | |
| 7,036,302 B2 | 5/2006 | Myers, Jr. et al. | |
| 7,137,242 B2 | 11/2006 | Griffiths | |
| 7,934,466 B2 * | 5/2011 | Collmer et al. ............... | 118/663 |
| 2008/0271456 A1 | 11/2008 | Scully et al. | |
| 2009/0126802 A1 * | 5/2009 | Rawlinson ...................... | 137/98 |
| 2009/0320480 A1 | 12/2009 | Scully | |

* cited by examiner

*Primary Examiner* — Afit Chaudry
(74) *Attorney, Agent, or Firm* — Oliff PLC

(57) ABSTRACT

A fuel system comprises a supply unit operable to deliver a metered supply of fuel to a supply manifold, a staging valve operable to control the supply of fuel from the supply manifold to a pilot outlet and a main outlet, and control means operable to control the operation of the staging valve to control whether fuel is delivered through the pilot and/or main outlet thereof.

10 Claims, 4 Drawing Sheets

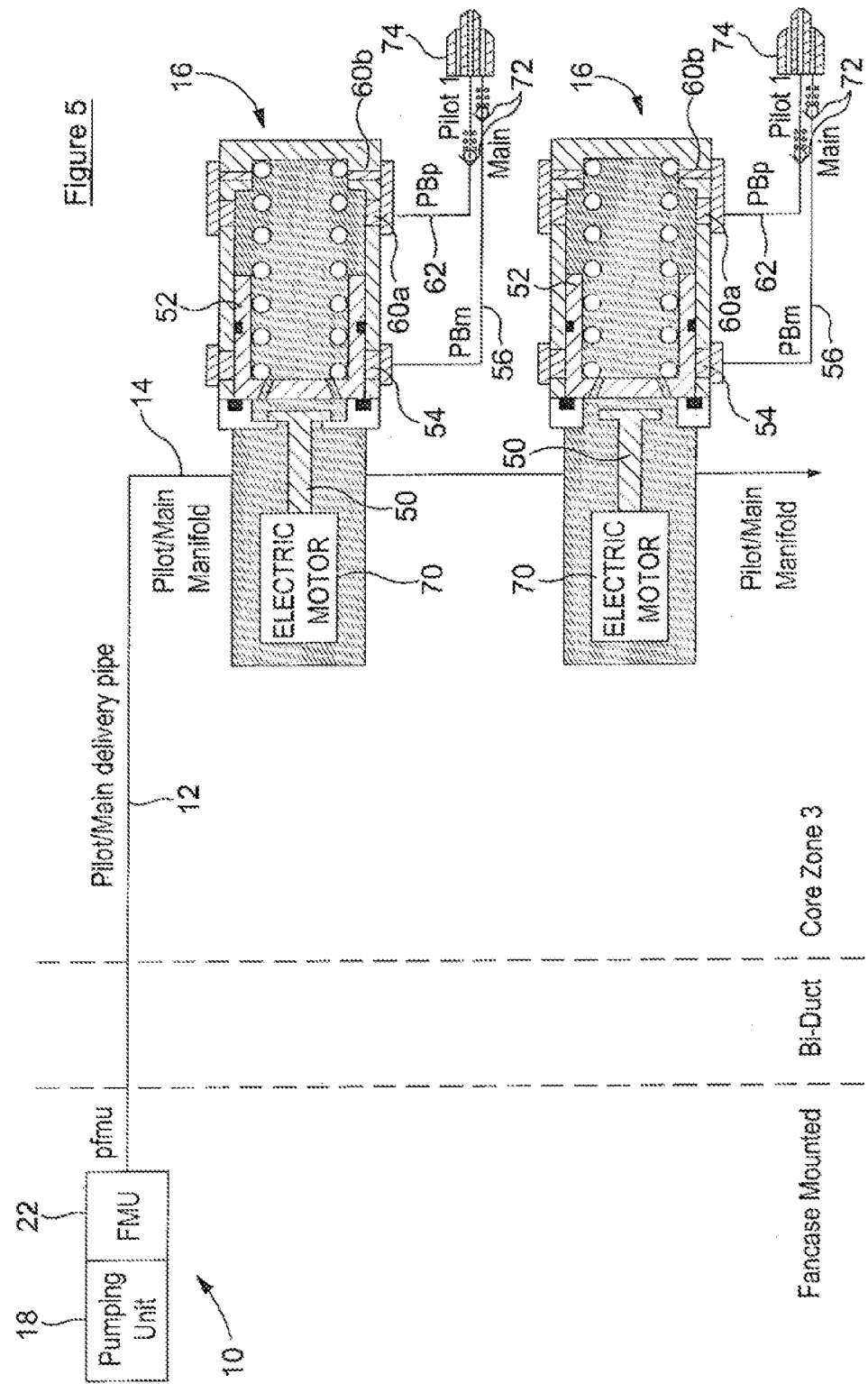

FUEL SYSTEM

This invention relates to a fuel system and in particular to a fuel system for use in aerospace applications to allow control over the delivery of fuel to the burners of an engine.

It is becoming increasingly common to provide an aircraft gas turbine engine with a plurality of main nozzles through which a main supply of fuel is delivered to the engine, and also to provide a plurality of pilot nozzles through which a pilot supply of fuel is delivered. By appropriate control over the split of fuel between these two groups of nozzles, enhanced combustion efficiency and a reduction in exhaust emissions can be achieved.

A number of fuel staging systems are known for use in controlling the split of fuel between the pilot nozzles and the main nozzles of an engine. For example, US2008/0271456, US2009/0320480, U.S. Pat. No. 6,955,040, U.S. Pat. No. 7,036,302, U.S. Pat. No. 7,137,242 and U.S. Pat. No. 7,007,476 all describe fuel staging systems.

Difficulties are faced in designing fuel staging systems as there is a need to accurately control the split of fuel between the pilot and main nozzles whilst also avoiding the presence of fuel lines along which no or little fuel is flowing at any given time as the heating of the fuel in such lines as they extend close to the engine can have a detrimental effect upon the fuel. To achieve an accurately controlled split of fuel between the pilot and main nozzles, a staging valve arrangement of relatively complex form is typically used. However, control of such an arrangement would typically require several fuel delivery and/or control lines to be connected thereto, increasing the risk of fuel stagnating in the lines and so resulting in undesirable degradation of the fuel.

Furthermore, when fuel is being delivered only through the pilot nozzles there is a concern that, at low fuel delivery rates, lean blow-out of the engine or other undesirable effects may occur.

It is an object of the invention to provide a fuel system suitable for use in such applications which is of relatively simple and convenient form and in which the disadvantages associated with known arrangements are of reduced effect.

According to a first aspect of the invention there is provided a fuel system comprising a supply unit operable to deliver a metered supply of fuel to a supply manifold, a staging valve operable to control the supply of fuel from the supply manifold to a pilot outlet and a main outlet, and control means operable to control the operation of the staging valve to control whether fuel is delivered through the pilot and/or main outlet thereof.

It will be appreciated that with such an arrangement, a reduction in the number of lines or manifolds that are required can be achieved, thus stagnation of fuel can be avoided or reduced. Furthermore, the system is of relatively simple form.

In one embodiment, the staging valve is fuel-draulically controlled. In such an arrangement, the control means may comprise a control unit operable to control a pressure difference between the fuel pressure within a control manifold and that within the supply manifold, the staging valve being operable in response to the said pressure difference.

In such an arrangement, two lines or manifolds are present.

Conveniently the control unit comprises a pump operable to raise the fuel pressure within the control manifold above that within the supply manifold, and to maintain the aforementioned pressure difference therebetween.

Preferably, a restricted flow path is provided between the control manifold and the supply manifold. With such an arrangement, a reduction in the operating speed of the pump, in combination with the presence of the restricted flow path, allows the said pressure difference to be reduced, whilst increasing the pump operating speed raises the pressure difference. Furthermore, as there are no fuel leakage paths from the downstream side of the supply unit to the upstream side thereof all of the metered supply of fuel is ultimately delivered to one or other of the pilot outlet and the main outlet. The presence of the fuel system does not, therefore, negatively impact upon fuel metering accuracy.

In an alternative arrangement, the staging valve may be electrically controlled. For example, it may include an electric motor operable to drive the staging valve to positions in which fuel is delivered from the supply manifold to the pilot and/or main outlet thereof. Such an arrangement requires the provision of just a single line or manifold.

In either arrangement, the fuel system conveniently includes a plurality of staging valves, at least one of which is designed in such a manner that there is constant communication between the pilot outlet and the supply manifold and another of which is designed in such a manner that communication between the supply manifold and the pilot outlet can be significantly restricted. Such an arrangement is advantageous in that, when desired, the supply of fuel from some of the staging valves can be significantly reduced, whilst ensuring that the delivery rate to the pilot outlets of the remaining staging valves is sufficiently high as to avoid the occurrence of a lean blow-out event.

The invention further relates to a staging valve suitable for use in the first above described arrangement. The staging valve conveniently comprises a control piston having a first surface thereof exposed to a pressure within a first control chamber connected, in use, to the control manifold, and a second surface thereof exposed to a pressure within a second control chamber connected, in use, to the supply manifold, a valve member controlling communication between the supply manifold and main and pilot outlets, and a push rod transmitting movement of the control piston to the valve member.

In such an arrangement, when the fuel pressure within the first and second control chambers is substantially equal (or at least the pressure difference therebetween is small), the valve member occupies a first position in which the main outlet is closed. When the pressure difference is at an intermediate level, the main outlet and the pilot outlet are both open, and when the pressure difference is higher still, the valve member closes or partially closes the pilot outlet whilst the main outlet remains open. Some of the staging valves may further be movable to a condition in which communication between the supply manifold and both the pilot outlet and the main outlet is significantly restricted, and so a significantly reduced fuel delivery takes place through those staging valves. The use of such a system provides lean blow-out protection functionality.

The invention will further be described, by way of example, with reference to the accompanying drawings, in which:

FIG. 5 is a schematic view similar to FIG. 1 but illustrating an alternative embodiment.

Figure 1:
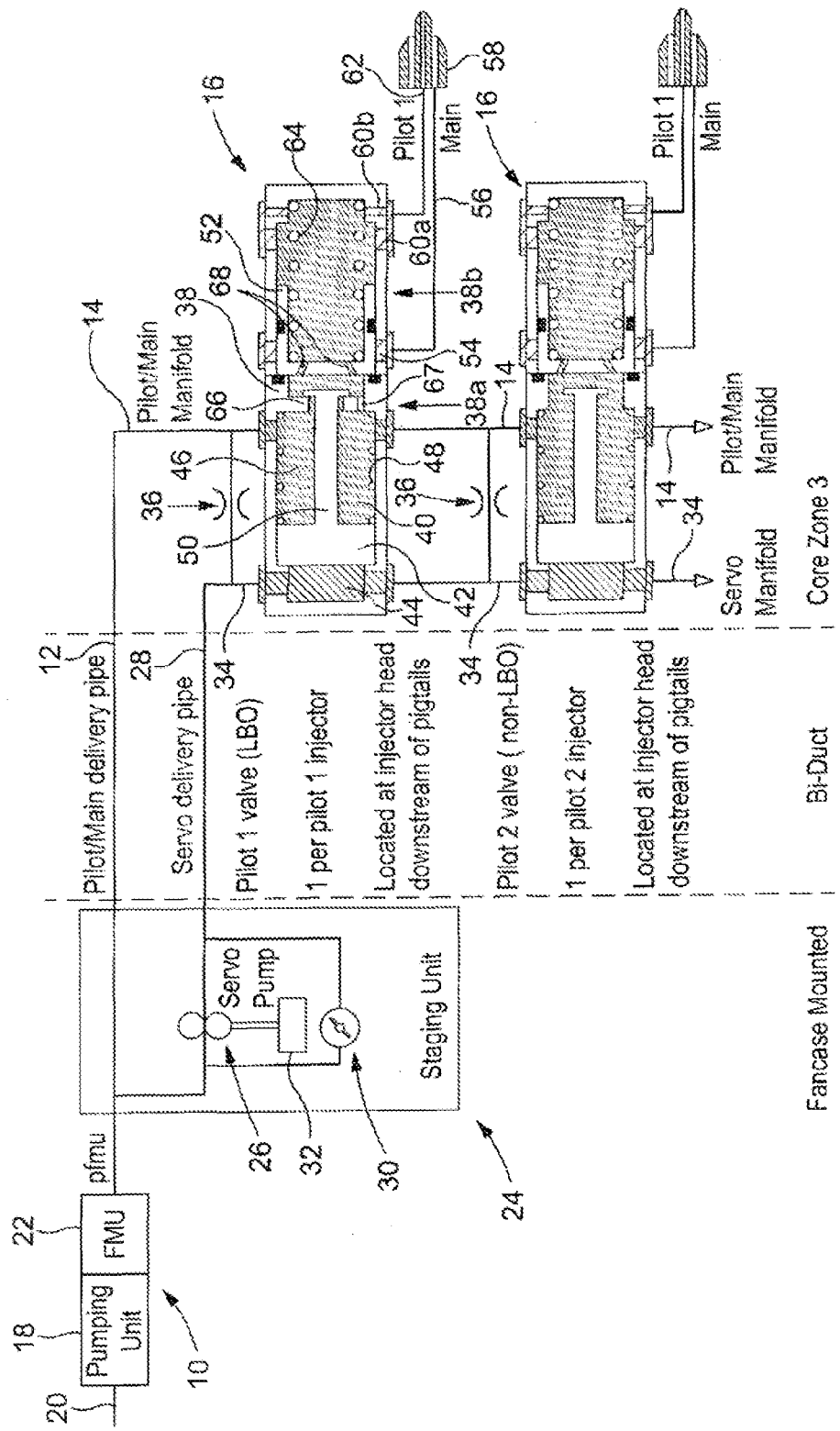
FIG. 1 is a schematic view illustrating a fuel system in accordance with one embodiment of the invention in a first operating mode.

Referring to FIGS. 1 to 4 of the accompanying drawings there is illustrated a fuel system comprising a supply unit 10 operable to supply a metered quantity of fuel to a supply line 12. The supply line 12 extends from a fancase section of the engine where the supply unit 10 is mounted, across a bi-duct of the engine to a core zone of the engine with which the fuel system is associated, and is connected to a supply manifold 14 mounted on the core zone to which a series of staging valves 16 are connected. The supply unit 10 may take a wide range of forms. As illustrated it comprises a pumping unit 18 operable to pump fuel from a low pressure inlet line 20 upstream of the supply unit 10 to a metering unit 22 from which the fuel flows to the supply line 12 downstream of the supply unit 10. Although not shown, the metering unit 22 may include a metering valve operable to control the rate at which fuel flows to the supply line 12, and a spill valve operable to maintain a substantially uniform pressure drop across the metering valve. In the event that the pressure difference across the metering valve becomes too high, then the spill valve operates to return a quantity of fuel from the outlet of the pumping unit 18 to the inlet side thereof, thereby reducing the pressure difference across the metering valve. The pumping unit 18 conveniently comprises a positive displacement pump such as a gear pump. Whilst a particular type of supply unit 10 is outlined hereinbefore, it will be appreciated that the invention is not restricted in this regard and a range of supply units of other types, or modifications to the supply unit 10 described hereinbefore, are possible without departing from the scope of the invention.

Connected to the supply line 12 is a control unit 24 in the form of a centrifugal pump 26 operable to feed a controllable quantity of fuel from the supply line 12 to a control line 28 and thereby raise the fuel pressure within the control line 28 above the fuel pressure within the supply line 12. A differential pressure transducer 30 monitors the pressure difference between the supply and control lines 12, 28, and the output of the transducer 30 is used in controlling the operation of a motor 32 that drives the pump 26 so as to allow the pump 26 to be driven at a speed controlled to achieve a desired pressure differential between the supply and control lines 12, 28 at any given time.

Whilst a motor driven centrifugal pump 26 is a convenient form of pump for use in this application, it will be appreciated that other forms of pump could be used. Furthermore, separate pressure sensors could be used to sense the pressures in the control and supply lines 12, 28 to allow control over the pressure differential therebetween, instead of the use of a differential pressure transducer 30, if desired.

The control line 28 is connected to a control manifold 34 which, like the supply manifold 14, is connected to the staging valves 16. The control manifold 34 and supply manifold 14 are interconnected by a series of restricted flow paths 36. It will be appreciated that the pressure difference between the control manifold 34 and the supply manifold 14 is dependent upon the operating speed of the pump 26, and hence the rate at which fuel is supplied to the control manifold 34, relative to the size of the restriction of the flow paths 36, and hence the rate at which fuel is able to flow from the control manifold 34 to the supply manifold 14.

Each staging valve 16 comprises a multi-part housing 38 forming a control part 38a and a valve part 38b. The control part 38a defines a bore 40 within which a control piston 42 is moveable. The piston 42 and bore 40 together define a first control chamber 44 which is connected to the control manifold 34 and a second control chamber 46 which is connected to the supply manifold 14. A first surface of the piston 42 is thus exposed to the control manifold pressure whilst a second surface of the piston 42 is exposed to the supply manifold pressure. A spring 48 is located within the second control chamber 46 and engages the piston 42, urging the piston 42 to the left in the orientation illustrated. It will be appreciated that, in use, the position occupied by the piston 42 is dependent upon the pressure difference between the control and supply manifolds 14, 34. As this pressure is varied by the operation of the control unit 24, it will be appreciated that the position of the piston 42 is controlled by the control unit 24, and so that by appropriate control over the control unit, the piston 42 can be moved to and held in a desired position at any given time.

Figure 2:
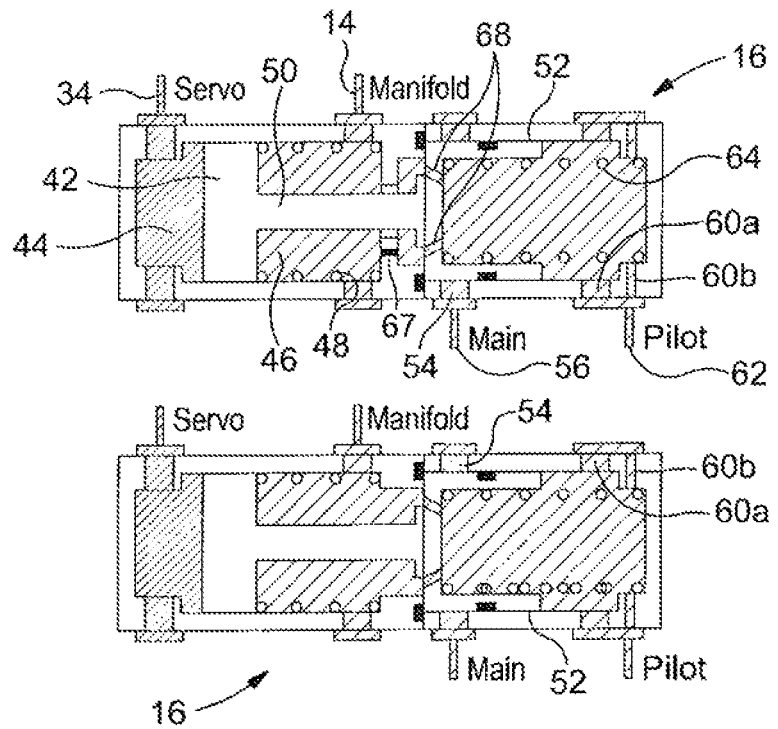
FIGS. 2 to 4 illustrate part of the fuel system in three further operating modes.

The piston 42 is provided with a push rod 50 which is engageable with a valve member 52 slidable within a bore formed in the valve part 38b of the staging valve housing 38. As illustrated, the valve part 38b includes a series of main outlet ports 54 which are axially aligned with one another and, together, communicate with a main outlet line 56 whereby fuel can be delivered to a main injector, or main injector part of a combined injector 58. Axially spaced from the main outlet ports 54 are first and second sets of pilot outlet ports 60a, 60b. The pilot outlet ports 60a, 60b all communicate via a pilot outlet line 62 with a pilot injector or pilot injector part of a combined injector 58. The valve member 52 is slidable between a first position (as shown in FIGS. 1 and 2) in which it closes the main outlet ports 54, but does not obstruct the pilot outlet ports 60a, 60b, a second, intermediate position (see FIG. 3) in which the pilot outlet ports 60a, 60b and main outlet ports 54 are all open, and a third position (see FIG. 4) in which the main outlet ports 54 are open but the valve member 52 obstructs and closes the first set of pilot outlet ports 60a. It should be noted that the valve member 52 is not able to close the second set out pilot outlet ports 60b, regardless as to its position as a step in the bore of the valve part 38b prevents movement of the valve member 52 to a position in which closure of the second set of pilot outlet ports 60b would occur.

Check valves may be located downstream of the staging valves 16 to maintain primed fuel volumes and form drip tight seals. As shown, seals are conveniently incorporated into the staging valve 16 between the valve member 52 and the valve part 38b to reduce the risk of or avoid leakage of fuel to the main outlet ports 54 other than when desired.

A spring 64 is provided in the bore of the valve part 38b and serves to bias the valve member 52 to the aforementioned first position.

As shown in FIG. 1, the push rod 50 is arranged so as to be spaced from the valve member 52 when the valve member 52 is in its first position and the piston 42 is in its left hand most position.

The fuel system includes two groups of staging valves 16 of slightly different forms. A first form (shown in the upper part of FIG. 1) includes an inwardly projecting valve seat 66 with which an enlarged end part of the push rod 50 can engage to form a metal to metal seal and significantly restrict the flow of fuel from the supply manifold to the bore of the valve part 38b of the staging valve 16. A bypass orifice 67 is incorporated into the design of the valve seat 66 to ensure that a restricted flow of fuel is maintained through the first group of staging valves 16 to a first group of pilot injectors, via the orifice 67 and openings 68 formed in the valve member 52, when the fuel system is in a lean blow-out protection operating mode, as illustrated in FIG. 1. In the second form (shown in the lower part of FIG. 1), the valve seat 66 is omitted with the result that the supply manifold 14 is in constant communication with the bore of the valve part 38b of the housing via the openings 68 formed in the valve member 52, fuel always being able to flow from the supply manifold 14 via the openings 68 to at least the second set of pilot outlet ports 60b.

In use, four different operating modes are possible as illustrated in FIGS. 1 to 4. As mentioned hereinbefore, FIG. 1 illustrates the fuel system in a lean blow-out protection operating mode. In this mode of operation, the pump 26 of the control unit 24 is not operating or is operating at a low speed with the result that the fuel pressure within the control manifold 34 and that within the supply manifold 14 are very similar, and the spring 48 ensures that the piston 42 of each staging valve 16 is held in its left-hand most position. In this position, the push rod 50 does not engage the valve member 52, and the valve member 52 is held in its left-hand most, first position by the spring 64. For the first group of staging valves 16, the engagement of the push rod 50 with the valve seat 66 significantly reduces fuel delivery from these valves. A restricted flow of fuel is maintained through the bypass orifice 67 and the openings 68 to the first group of pilot injectors to ensure that this group of injectors and the associated lines 62 are not drained of fuel during the lean blow-out protection operating mode, which could potentially result in a drop-off in engine performance when switching to another operating mode. It is recognised that this restricted flow of fuel to the first group of pilot injectors, which is approximately 10% of the total pilot delivery, may not maintain a combustion flame at the heads of these injectors. For the second group of staging valves 16 in which no such seat 66 is provided, fuel is able to flow from the supply manifold to the bore of the valve part 38b via the openings 68. As the valve member 52 is in its first position in which it closes the main outlet ports 54 but both sets of pilot outlet ports 60a, 60b are open, it will be appreciated that an unrestricted pilot delivery of fuel will take place from these valves. By providing for a significantly reduced pilot delivery of fuel through some of the staging valves 16 to their associated pilot injectors, and for an unrestricted pilot delivery from others of the staging valves 16 to their associated injectors, it will be appreciated that a means of providing lean blow-out protection is created.

FIG. 2 shows the staging valves 16 in a second mode of operation. In this mode of operation, the pump 26 is driven at a speed sufficient to maintain a pressure difference between the control and supply manifolds 34, 14 large enough to hold the piston 42 of each staging valve 16 in a position in which the push rod 50 thereof has moved into engagement with the associated valve member 52, but does not result in movement of the valve member 52. The valve member 52 thus still occupies its first position, preventing a main delivery of fuel whilst permitting a substantially unrestricted pilot delivery. For the first group of staging valves in which the seat 66 is provided, the movement of the piston 42 and push rod 50 results in the enlarged end part of the push rod 50 disengaging from the valve seat 66 thus allowing fuel flow to the pilot outlet ports 60a, 60b of the first group of valves to substantially increase, thus in this mode of operation a substantially unrestricted pilot delivery of fuel takes place through all of the staging valves 16, rather than just through a proportion of them.

Figure 3:
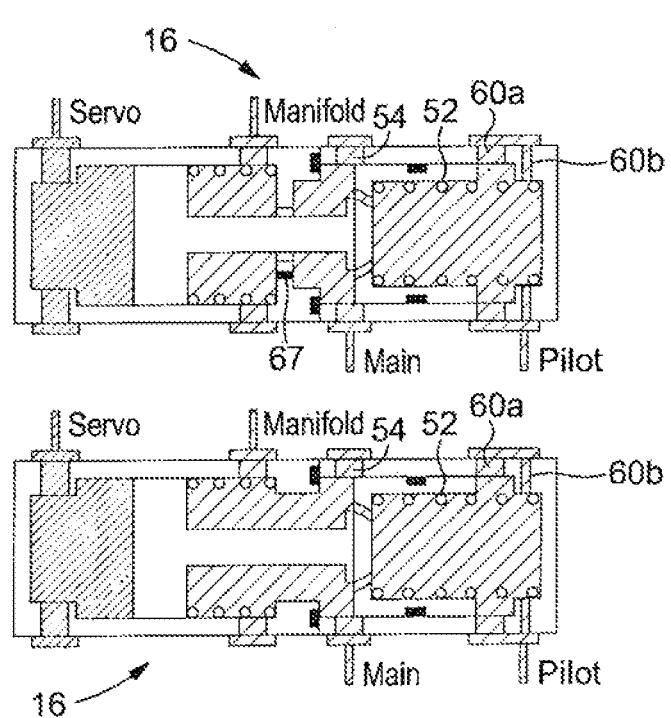

In a third operating mode as shown in FIG. 3, the pressure difference between the control and supply manifolds 34, 14 is increased to a level sufficient to cause the piston 42 to occupy a position in which the valve member 52 is moved to its second position. In this position, the main outlet ports 54 are opened and so a main delivery of fuel takes place through both groups of staging valves 16 to the associated main injectors. The pilot outlet ports 60a, 60b are still open and so a pilot fuel delivery also takes place through both groups of staging valves 16 to the associated pilot injectors. The split of fuel to the pilot and main injectors in this mode of operation is approximately a 30/70 split, which is required to ensure that the potentially catastrophic engine phenomenon of combustion rumble is avoided.

Figure 4:
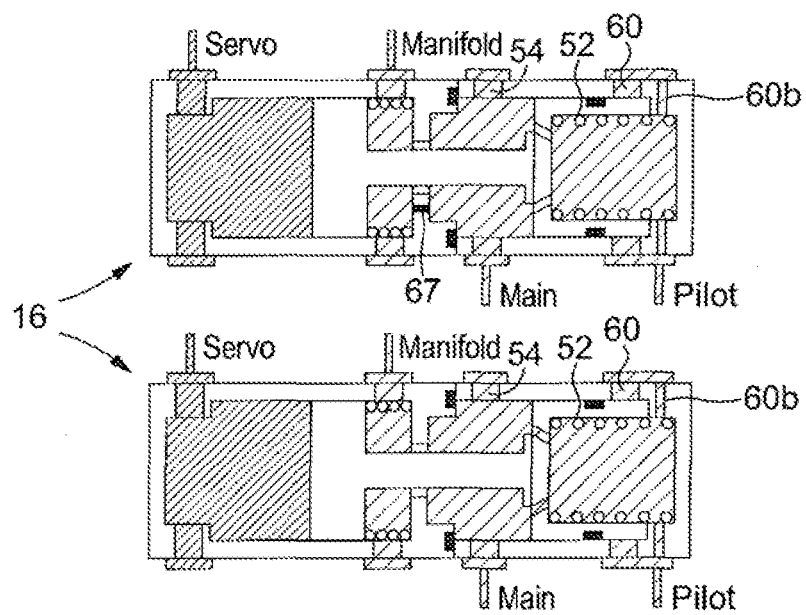

In a fourth operating mode, the piston 42 and valve member 52 are moved to their extreme right-hand positions as illustrated in FIG. 4. In this position, the valve member 52 closes the first set of pilot outlet ports 60a, the second set 60b remaining open. The main outlet ports 54 also remain open. Main and restricted pilot fuel deliveries thus take place. The split of fuel in this normal operating mode being of the order of, for example, 20/80.

It will be appreciated that the staging valves 16 can be moved between their various operating positions simply by appropriate control over the operation of the control unit 24. By providing a system capable of providing a number of different splits of fuel between the pilot and main outlet ports, it will be appreciated that combustion efficiency can be enhanced and a reduction in exhaust emissions can be realised, which, clearly, is advantageous. As the operation of the staging valves 16 is controlled using the difference in fuel pressure between the supply manifold 14 and the control manifold 34, it will be appreciated that only two lines or manifolds need to extend across the high temperature engine bi-duct. Fuel stagnation and thermal degradation problems can thus be minimised. Furthermore, all of the metered supply of fuel is ultimately delivered to the pilot or main injectors, so no reduction in the accuracy of the fuel flow delivered to the pilot and main injectors results from the provision of this fuel staging system.

In the arrangement described hereinbefore, the staging valves 16 are fuel-draulically controlled, using the pressure difference between the control manifold 34 and the supply manifold 14 to control the operation of the staging valves 16. FIG. 5 illustrates an alternative arrangement in which the staging valves 16 are of electrically controlled form. Other than as described below, the fuel system of FIG. 5 is similar to that of FIGS. 1 to 4, and so the description hereinbefore is, where appropriate, relevant to the embodiment of FIG. 5.

As shown in FIG. 5, each staging valve 16 incorporates an electrically driven motor 70 operable to drive the push rod 50 of the staging valve 16 for axial movement. The motor 70 may comprise, for example, a stepper motor and may drive the push rod 50 for axial movement via a ball-screw coupling. It will be appreciated, however, that other arrangements are possible without departing from the scope of the invention. Movement of the push rod 50, as with the arrangement of FIGS. 1 to 4, results in movement of the valve member 52, controlling whether fuel is delivered from the supply manifold 14 to just the pilot outlet ports 60a, 60b, or to both the pilot outlet ports 60a, 60b and the main outlet ports 54, and also controlling whether the pilot delivery is restricted by closing of the first set of pilot outlet ports 60a.

Position sensors, for example monitoring the position of the motor 70 or the push rod 50, may be provided to allow closed loop control of, or failure detection associated with, the operation of the staging valves. Alternatively, monitoring of the stepped movement of the stepper motor may be used to provide a coarser form of this functionality.

It will be appreciated that the embodiment of FIG. 5 is advantageous in that, as the staging valves are electrically rather than hydraulically or fuel-draulically controlled, control thereof is achieved by the use of an electrical connection rather than a fuel line extending across the bi-duct. The number of fuel lines or manifolds is thus further reduced, with the benefits set out hereinbefore. Furthermore, the control unit 24 may be omitted.

As shown in FIG. 5, low-pressure check valves 72 are conveniently provided between the pilot and main outlets 60a, 60b, 54 and the associated fuel injectors 74, adjacent the injectors 74. The purpose of such valves 72 is to keep the associated lines 56, 62, and to an extent the injectors 74, primed, or at least partially primed, with fuel when fuel delivery is only taking place through some of the injectors 74. By keeping the lines 56, 62 associated with injectors 74 which are 'staged-out' at any given time primed in this manner, recommencement of fuel delivery, or staging-in, of those injectors 74 can occur more quickly than would be the case if full priming of the relevant lines 56, 62 were required, so reducing the impact on combustor and engine performance. Whilst only illustrated in the arrangement of FIG. 5, it will be appreciated that such valves could be provided in the arrangement of FIGS. 1 to 4.

Whilst the description hereinbefore is just of two embodiments, it will be appreciated that a wide range of modifications and alterations may be made without departing from the scope of the invention.

The invention claimed is:

1. A fuel system comprising:
    a supply unit configured to deliver a metered supply of fuel to a supply manifold;
    a plurality of staging valves, each configured to control the supply of fuel from the supply manifold to a respective pilot injector or pilot injector part of a combined injector via a pilot outlet and a respective main injector or main injector part of a combined injector via a main outlet; and
    a control means configured to control the operation of the plurality of staging valves to control whether fuel is delivered through the pilot and/or main outlet thereof and wherein the control means comprises a control unit configured to control a pressure difference between the fuel pressure within a control manifold and that within the supply manifold, the plurality staging valves being configured to respond to the said pressure difference.

2. The fuel system according to claim 1, wherein the plurality of staging valves are fuel-draulically controlled.

3. The fuel system according to claim 1, wherein the control unit comprises a pump configured to raise the fuel pressure within the control manifold above that within the supply manifold, and to maintain the aforementioned pressure difference therebetween.

4. The fuel system according to claim 3, wherein a restricted flow path is provided between the control manifold and the supply manifold.

5. The fuel system according to claim 4, wherein a reduction in the operating speed of the pump, in combination with the presence of the restricted flow path, allows the said pressure difference to be reduced, whilst increasing the pump operating speed raises the pressure difference.

6. The fuel system according to claim 1, wherein the plurality of staging valves are electrically controlled.

7. The fuel system according to claim 6, wherein the plurality of staging valves include an electric motor configured to drive the plurality of staging valves to positions in which fuel is delivered from the supply manifold to the pilot and/or main outlet thereof.

8. The fuel system according to claim 1, wherein at least one of the staging valves is designed in such a manner that there is constant communication between the pilot outlet and the supply manifold and another of the staging valves is designed in such a manner that communication between the supply manifold and the pilot outlet can be significantly restricted.

9. The fuel system according to claim 1, further comprising pilot and main outlet lines connecting the pilot and main outlets to the pilot and main injectors or the pilot and main injector parts of a combined injector, and low-pressure check valves provided in the pilot and main outlet lines.

10. A fuel system comprising:
    a supply unit configured to deliver a metered supply of fuel to a supply manifold;
    a plurality of staging valves, each configured to control the supply of fuel from the supply manifold to a respective pilot outlet and a respective main outlet, at least one of the staging valves is designed in such a manner that there is constant communication between the respective pilot outlet and the supply manifold and another of the staging valves is designed in such a manner that communication between the supply manifold and the respective pilot outlet can be significantly restricted, and
    a control means configured to control the operation of the plurality of staging valves to control whether fuel is delivered through the pilot outlet and/or main outlet thereof.

* * * * *